UNITED STATES PATENT OFFICE.

JOHN ALEXANDER HUNTER, OF PHILADELPHIA, PENNSYLVANIA.

PROCESS OF CONVERTING CAST-IRON INTO STEEL OR MALLEABLE IRON.

1,112,909.      Specification of Letters Patent.      Patented Oct. 6, 1914.

No Drawing.      Application filed June 3, 1913.   Serial No. 771,375.

*To all whom it may concern:*

Be it known that I, JOHN A. HUNTER, a citizen of the United States, residing at Philadelphia, in the county of Philadelphia and State of Pennsylvania, have invented certain new and useful Improvements in Processes of Converting Cast-Iron into Steel or Malleable Iron, of which the following is a specification.

My invention relates to the manufacture of steel or malleable iron from cast-iron, and particularly to processes of converting solid forms of cast-iron into steel or malleable iron, wherein the cast-iron is first heated in a suitable furnace or other device to a high temperature below the melting point and wherein the highly heated cast-iron is then subjected to the action of agencies, such as acids, the vapors of which, coming into contact with the highly heated cast-iron, decompose and give off oxygen which burns the impurities in the iron and effects the decarbonization thereof and other chemical and physical changes which result in the production of a metal capable of being rolled, hammered or drawn, and having a capacity for taking a high temper.

The object of my present invention is to provide a novel and efficient process which will effect such decarbonization and other chemical and physical changes in a manner to reduce the amount of scale and roughness that has been present on the finished forms of cast-iron in prior processes, and in a manner to produce a metal having superior qualities for being rolled, hammered, drawn, twisted, machined and tempered.

A further object of my present invention is to reduce the time heretofore required to effect the described changes in the cast-iron; and a further object of the invention is to provide a novel process which will not require the heating of the forms of cast-iron to as high a temperature as has been heretofore necessary in former processes before the introduction of the agent which effects the decarbonization of the iron and the other desired changes therein, resulting in the saving of fuel and other desirable advantages.

The essential feature of my improved process is in subjecting the forms of cast-iron in a highly heated state to the action of nitric acid; and in carrying out my process I proceed as follows: The solid forms of cast-iron to be treated are placed within a suitable furnace or other device in which the cast-iron forms may be heated to a high temperature; and I refer to my previous United States Patent No. 699,759, dated May 13, 1902, as showing a suitable furnace in which the iron may be heated and in connection with which my improved process may be performed. After placing the cast-iron forms within the furnace I burn a suitable fuel therein until the iron is heated to a high temperature, below the melting point. I find that heating the iron to a temperature between 1400° and 1500°, Fahrenheit, is usually sufficient for the purposes of my present invention. When the iron has been thus heated, I introduce the nitric acid to the furnace and preferably to the bottom of the mass of heated cast-iron forms therein by any suitable means. The high temperature of the iron and the furnace vaporizes the nitric acid and the gases thereof ascend through the mass of cast-iron forms, decompose and give off oxygen and burn the impurities in the iron and greatly increase the temperature of the furnace and thereby effect the desired decarbonization and other chemical and physical changes in the cast-iron forms, in accordance with the objects of my invention.

The nitric acid may be introduced to the heated iron by many different means, such, as the means shown in my said patent for supplying the treating agent to the furnace or the acid may be forced into the furnace by air pressure in the form of a spray, or the acid may be permitted to flow by gravity through suitable conducting devices to the heated iron. The supply of the fuel for originally heating the iron may be stopped before or shortly after the introduction of the nitric acid. The iron is permitted to remain in the closed furnace a number of hours to cool the iron after the acid is introduced and the supply of fuel is stopped; usually about eighteen hours which I have found to give very desirable results. This time may, however, be varied, and such variation will, of course, vary the characteristics in the metal produced by my process. I have found that the use of about eighty ounces of nitric acid with about ten tons of cast-iron forms gives very desirable results.

The essential of my invention is the treatment of forms of cast-iron in a highly heated state and below the melting point with nitric acid and I do not limit myself to the use of any particular device in which the iron is heated, or to the use of any particular device for introducing the nitric acid to the heated iron, or to subjecting the heated iron to the action of the nitric acid at any particular temperature or to the use of any particular quantity of nitric acid with any particular quantity of cast-iron.

Having thus described my invention, what I claim as new and desire to secure by Letters Patent, is—

1. In the manufacture of steel and malleable iron, the described process, which consists in submitting cast-iron at a high heat but below the melting point in a suitable mechanical device to the action of nitric acid, substantially as described.

2. In the manufacture of steel and malleable iron, the described process which consists in submitting cast-iron in solid form at a high heat in a suitable mechanical device to the action of nitric acid, substantially as described.

3. In the manufacture of steel and malleable iron, the described process, which consists in submitting cast-iron in solid form at a high heat in a suitable mechanical device to the action of nitric acid and then permitting the cast iron to cool within said device, substantially as described.

In testimony whereof I affix my signature in presence of two witnesses.

JOHN ALEXANDER HUNTER.

Witnesses:
  S. I. HARPER,
  A. V. GROUPE.